G. W. BAKER.
BIFOCAL SPECTACLES AND EYEGLASSES.
APPLICATION FILED JULY 25, 1912.
1,049,645.
Patented Jan. 7, 1913.
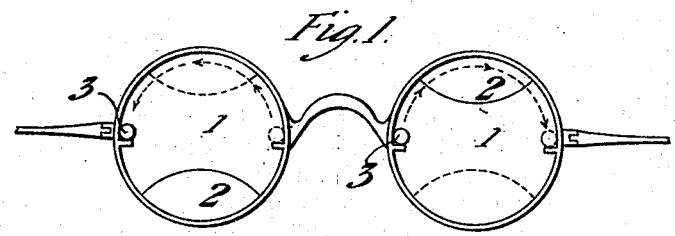
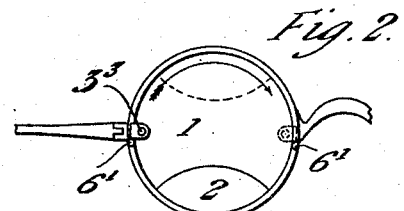
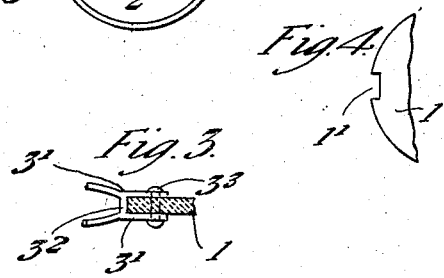
Witnesses:
Inventor
George W. Baker

UNITED STATES PATENT OFFICE.

GEORGE WISTON BAKER, OF NORTH SYDNEY, NEW SOUTH WALES, AUSTRALIA.

BIFOCAL SPECTACLES AND EYEGLASSES.

1,049,645.  Specification of Letters Patent.  Patented Jan. 7, 1913.

Application filed July 25, 1912. Serial No. 711,530.

*To all whom it may concern:*

Be it known that I, GEORGE WISTON BAKER, a subject of the King of Great Britain, residing in New South Wales, (temporarily at Katanning, near Perth, Western Australia,) Australia, and whose post-office address is "Enuk", Milner's Crescent, Wollstonecraft, North Sydney, New South Wales, Australia, ophthalmic surgeon, have invented certain new and useful Improvements in Bifocal Spectacles and Eyeglasses, of which the following is a specification.

This invention which originally formed part of my co-pending application Serial No. 590489, relates to improvements in spectacles having bifocal glasses or lenses.

Users of bi-focal glasses, in which the lenses have been fixed in the spectacle or like frame, have been under considerable disadvantages because the auxiliary power or close vision segments or sectors of the lenses, although conveniently placed for reading and similar purposes, have been an impediment to the wearer's vision when walking for instance, because they prevent a clear and continuous view of the ground. To obviate the above disadvantages bifocal lenses have either been pivotally mounted directly on parts of the spectacle frame in a manner that when they are to be reversed they must necessarily be turned together, or they have been each mounted in separate auxiliary frames swiveling on the main frame.

The main object of this invention is to obviate the use of the secondary or auxiliary frame while allowing each lens to be revolved separately and independently of the other.

The lenses are so mounted in or upon the spectacle or other frame in such a way that each, independently of the other, can be partially rotated or moved so as to bring either the high or low power sectors, that is the close or distant vision lenses, or portions of lenses, into the field of vision, or so that said lenses will focus in the desired direction.

In order that the invention may be readily understood, it will be described by reference to the accompanying drawings, in which:—

Figure 1 represents a pair of bi-focal spectacles having circular bi-focal lenses arranged so that they can be turned around in the same vertical plane through about one half of their circumference. Fig. 2 is an elevation of a device for rotating a lens, Fig. 3 is a section of part of a lens with a modified device for turning the lens attached, and Fig. 4 is an elevation of part of the lens in the Fig. 3.

The same reference numerals indicate the same or corresponding parts in all the figures.

1 and 2 represent the two segments of a bi-focal lens. Each lens is circular and is mounted in a pair of circular rims in such a way that it can be turned around or through an angle of 180 degrees as indicated by dotted lines in Fig. 1. To admit of this movement the lens is mounted comparatively loosely in the rim instead of being gripped tightly or set in position as in the case of ordinary spectacles. To facilitate the rotation or semi-rotation of these bi-focal lenses, a small projection 3 is formed or fitted upon some convenient part of each lens near the periphery thereof.

The lens on the right hand side of the spectacle shown in Fig. 1 is illustrated in the position it would occupy with the close vision segment or auxiliary lens, 2, in its lower position, that is convenient for reading or close vision purposes. When in this position, this segment interferes with the vision by preventing a clear view of the ground or floor from being obtained. By, however, turning it over into the position indicated on the left hand side of the spectacles, a clear field of vision is at once afforded through the low power or distant vision segment 1 and consequently the spectacles can be used with perfect comfort and safety for walking about.

It will be obvious that the construction of the glasses illustrated in Fig. 1, can be modified in various details without departing from the essential feature of the invention. For example, instead of using a small knob or projection 3, on the face of the lens, a duplex clip can be arranged to project from the lens on each side of the rim and be restrained from being moved past a certain point by coming into engagement with a small stop or enlargement 6' on the rim. The clip may comprise two oppositely disposed parts 3' and a transverse part 3² adapted to fit a notch 1' fixed for the purpose in the periphery of the lens. It may be suitably secured to the lens, as for instance by the rivet 3³.

Having thus described the nature of my invention and the best means I know of car- rying the same into practical effect, I claim:—

1. In spectacles, the combination of a lens frame, a nose bridge piece attached to the frame, a pair of bi-focal lenses movably mounted on said frame and means for rotating each lens independently of one another, and in the vertical plane of the frame.

2. In spectacles, the combination of a lens frame, a nose bridge piece attached to the frame, a pair of bi-focal lenses movably mounted on said frame and means comprising a projection carried by each lens for rotating the lens independently of the other, and in the vertical plane of the frame.

In testimony whereof I have signed my name to this specification in the presence of two subscribing witnesses.

GEORGE WISTON BAKER.

Witnesses:
G. ALEC COOPER,
L. TILSLEY BAKER.